(12) United States Patent
Wright et al.

(10) Patent No.: US 9,436,492 B2
(45) Date of Patent: Sep. 6, 2016

(54) CLOUD VIRTUAL MACHINE PROVISIONING USING VIRTUAL STORAGE

(75) Inventors: Eron D. Wright, Sammamish, WA (US); Muhammad Umer Azad, Bellevue, WA (US); Sushant P. Rewaskar, Redmond, WA (US); Corey M. Sanders, Seattle, WA (US); Saad Syed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 548 days.

(21) Appl. No.: 13/462,275

(22) Filed: May 2, 2012

(65) Prior Publication Data

US 2013/0297921 A1 Nov. 7, 2013

(51) Int. Cl.
*G06F 9/44* (2006.01)
*G06F 9/455* (2006.01)

(52) U.S. Cl.
CPC ......... *G06F 9/45558* (2013.01); *G06F 9/4406* (2013.01); *G06F 2009/45562* (2013.01); *G06F 2009/45575* (2013.01)

(58) Field of Classification Search
CPC ............. G06F 9/45558; G06F 9/5077; G06F 9/4406; G06F 2009/45562; G06F 4009/45575; H04L 67/10
USPC ........................................................ 709/220
See application file for complete search history.

(56) References Cited

U.S. PATENT DOCUMENTS

| 7,577,722 | B1 | 8/2009 | Khandekar et al. | |
|---|---|---|---|---|
| 7,996,525 | B2 | 8/2011 | Stienhans et al. | |
| 8,103,776 | B2 | 1/2012 | DeHaan | |
| 8,468,591 | B2 * | 6/2013 | Silverstone | G06F 21/445 713/164 |
| 8,677,351 | B2 * | 3/2014 | Le et al. | 718/1 |
| 2008/0147375 | A1 | 6/2008 | Siren et al. | |
| 2008/0244577 | A1 * | 10/2008 | Le | G06F 8/63 718/1 |
| 2009/0193413 | A1 | 7/2009 | Lee | |
| 2011/0138047 | A1 | 6/2011 | Brown et al. | |
| 2012/0005467 | A1 * | 1/2012 | Butler | G06F 9/4416 713/2 |
| 2012/0144391 | A1 * | 6/2012 | Ueda | G06F 9/45558 718/1 |
| 2012/0204030 | A1 * | 8/2012 | Nossik | H04L 9/0822 713/168 |
| 2012/0254567 | A1 * | 10/2012 | Umbehocker | G06F 3/0604 711/162 |

(Continued)

OTHER PUBLICATIONS

Jin, Steve, "System Provisioning in Cloud Computing: From Theory to Tooling (Part I)", Published on: Jun. 30, 2010, Available at: http://blogs.vmware.com/vcloud/2010/06/system-provisioning-in-cloud-computing-from-theory-to-tooling-part-i.html.

*Primary Examiner* — Uzma Alam
(74) *Attorney, Agent, or Firm* — Ben Tabor; Doug Barker; Micky Minhas

(57) ABSTRACT

The provisioning of a virtual machine when booted from virtual storage. During virtual machine boot from an image, the virtual machine detects storage media. The virtual machine acquires a provisioning agent and provisioning data from the detected storage media. The virtual machine uses the provisioning data to provision itself, and executes the provisioning agent. The provisioning agent may monitor the progress of the provisioning and/or report a status of the provisioning. The virtual machine may operate in a cloud computing environment, the status of the provisioning agent being returned to the user through the cloud environment. The user need not generate the provisioning data in a format readable by the virtual machine. Instead, perhaps some naturally entered user input is used to automatically generate the properly formatted provisioning data using perhaps a service in the cloud.

20 Claims, 6 Drawing Sheets

(56) References Cited

U.S. PATENT DOCUMENTS

| | | | |
|---|---|---|---|
| 2013/0132950 A1* | 5/2013 | McLeod | G06F 8/63 718/1 |
| 2013/0139154 A1* | 5/2013 | Shah | G06F 9/45558 718/1 |
| 2013/0139155 A1* | 5/2013 | Shah | G06F 9/45558 718/1 |
| 2013/0232497 A1* | 9/2013 | Jalagam | G06F 9/5072 718/104 |
| 2013/0232498 A1* | 9/2013 | Mangtani | G06F 9/5072 718/104 |

* cited by examiner

CLOUD VIRTUAL MACHINE PROVISIONING USING VIRTUAL STORAGE

BACKGROUND

When an operating system is installed on a computing system (a "physical machine"), there are generally two phases of the installation process; namely, a copy phase, and a specialization phase. During the copy phase, files are copied from the installation medium to the computing system. During the specialization phase, the user is queried for information that is specific to the user and/or computing system to allow the operating system to be specialized for the user and/or computing system.

A virtual machine emulates the logic of a fully operational computing system including the operating system, its various applications, and corresponding settings. The virtual machine interfaces with the user via a remotely located client computing system. For instance, the virtual machine receives client input from the remote client, and provides resulting desktop image information back to the client. The client does not operate the corresponding operating system, but rather just receives the user input, relays the user input to the virtual machine, and renders the desktop using the resulting desktop image provided by the virtual machine. In some embodiments, virtual machines operate within a cloud computing environment. In any case, when a new virtual machine is provisioned from a generalized virtual machine image, user-specific and/or machine-specific parameters are set such that the virtual machine that has a specific identity and corresponds to a particular user and/or client computing system.

BRIEF SUMMARY

At least one embodiment described herein relates to the provisioning of a virtual machine when booted from a virtual machine image. During boot of the virtual machine from the virtual machine image, the virtual machine detects virtual storage media that is accessible to the virtual machine. The virtual machine acquires a provisioning agent and provisioning data from the detected storage media. The virtual machine uses the provisioning data to provision itself, and executes the provisioning agent. As examples, the provisioning agent may monitor the progress of the provisioning and/or report a status of the provisioning.

In one embodiment, the virtual machine operates in a cloud computing environment in which the status of the provisioning may be returned to the use through the cloud computing environment. In some embodiments, the user need not generate the provisioning data in a format readable by the virtual machine. Instead, perhaps just some input more naturally entered by the user is used to automatically generate the properly formatted provisioning data. This automated generation of the provisioning data may occur in the cloud computing environment. Thus, this embodiment makes the provisioning of a new virtual machine in a cloud computing environment more straightforward from the perspective of the user.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the provisioning of a virtual machine is described. During virtual machine boot from the image, the virtual machine detects virtual storage media. The virtual machine acquires a provisioning agent and provisioning data from the detected storage media. The virtual machine uses the provisioning data to provision itself, and executes the provisioning agent. The provisioning agent may monitor the progress of the provisioning and/or report a status of the provisioning. The virtual machine may operate in a cloud computing environment, the status of the provisioning being returned to the user through the cloud environment. The user need not generate the provisioning data in a format readable by the virtual machine. Instead, perhaps some naturally entered user input is used to automatically generate the properly formatted provisioning data using perhaps a service in the cloud.

First, some introductory discussion regarding computing systems will be described with respect to FIG. 1. Then, embodiments of the failover guaranty estimation will be described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
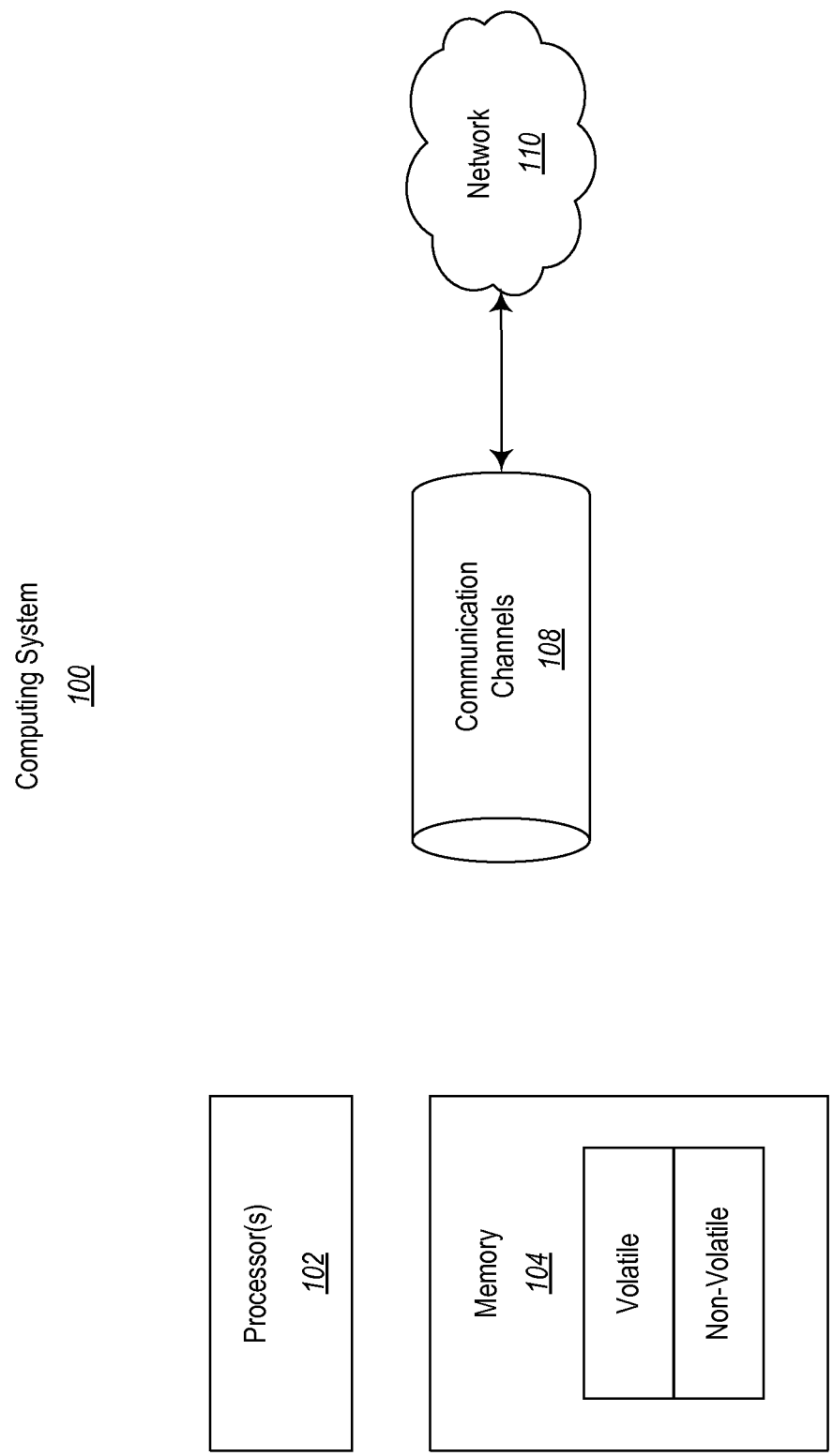
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
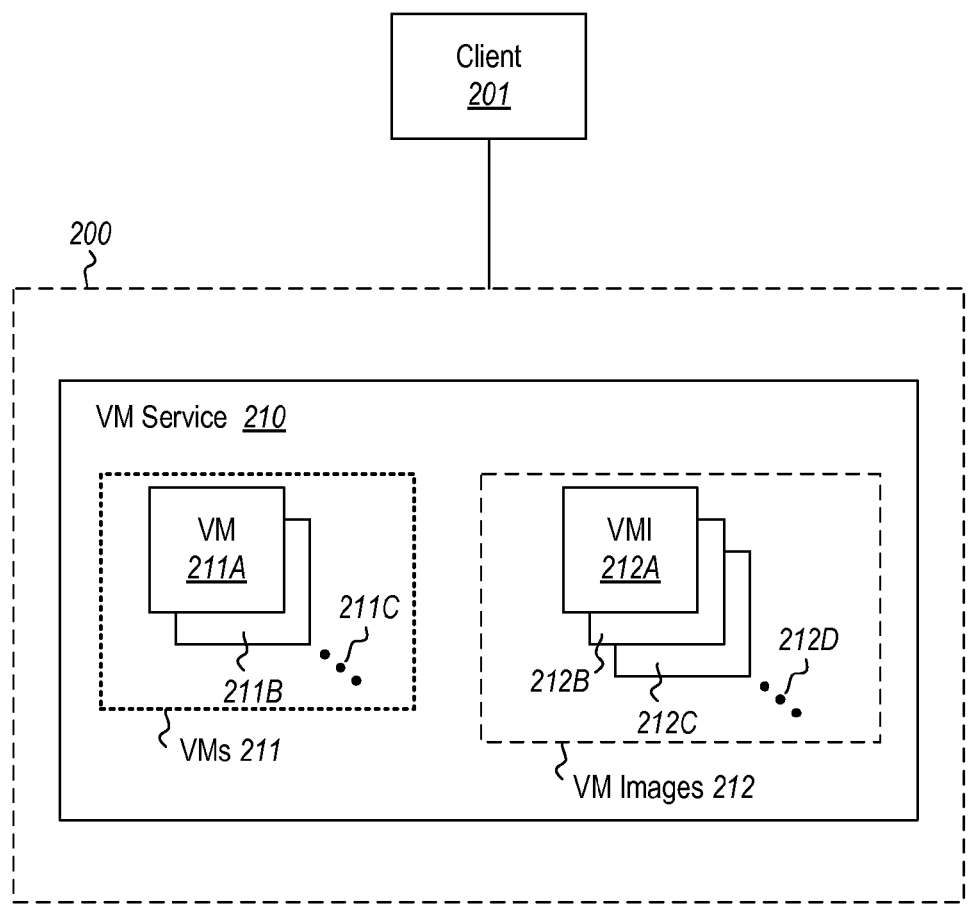
FIG. 2 illustrates an operating environment that interacts with a client computing system, and that may employ principles described herein.

FIG. 2 illustrates an operating environment 200 that interacts with a client computing system 201. In one embodiment, the operating environment may be a cloud computing requirement although that is not required. In this description and the following claims, "cloud computing" is defined as a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). In this description and in the claims, a "cloud computing environment" is an environment in which cloud computing is employed.

The client computing system uses a virtual machine service 210 within the operating environment 200. The virtual machine service 210 may be an aggregation of two or more services within the operating environment 200. The virtual machine service 210 provisions and provides virtual machines 211 for the use of client computing systems such as client computing systems 201. For instance, in virtual machine service 210, suppose virtual machine 211A is provisioned and assigned to the client computing system 201. The virtual machine service may operate other virtual machines as represented by virtual machine 211B, and the ellipses 211C.

During operation, the virtual machine 211A emulates a fully operational computing system including an at least an operating system, and perhaps one or more other applications as well. The virtual machine generates a desktop image or other rendering instructions that represent a current state of the desktop, and then transmits the image or instructions to the client for rendering of the desktop. As the user interacts with the desktop, the user inputs are transmitted to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

Referring to FIG. 2, the virtual machine service 210 also includes a virtual machine image library 212, which includes a plurality of virtual machine images. Virtual machine images include state that is used to instantiate corresponding virtual machine images. If the virtual machine image is a specialized virtual machine image, the virtual machine image is created specifically for a particular user. Accordingly, when the virtual machine image is instantiated, no further information regarding the user need be designated. However, a generalized virtual machine image does not include information that is specific to a particular user or a particular client computing system. Accordingly, in order for a specific virtual machine to be instantiated from a generalized virtual machine image, specific user and client machine information should be provided to populate the appropriate virtual machine. This process is often referred to as "provisioning" the virtual machine.

FIG. 2 illustrates that the virtual machine image library 212 includes virtual machine images 212A through 212C although the ellipses 212D represent that the virtual machine service 210 may include any number of virtual machine images. These virtual machine images may be specialized virtual machine images, although the principles described further below provision a generalized virtual machine image. Such virtual machine images may be pre-constructed images that were not fabricated by the customer, or perhaps may be customer-provided images. The customers may have, for example, created the virtual machine image outside of the operating environment 200, or perhaps may use a service within the operating environment 200 in order to construct the virtual machine image.

Figure 3:
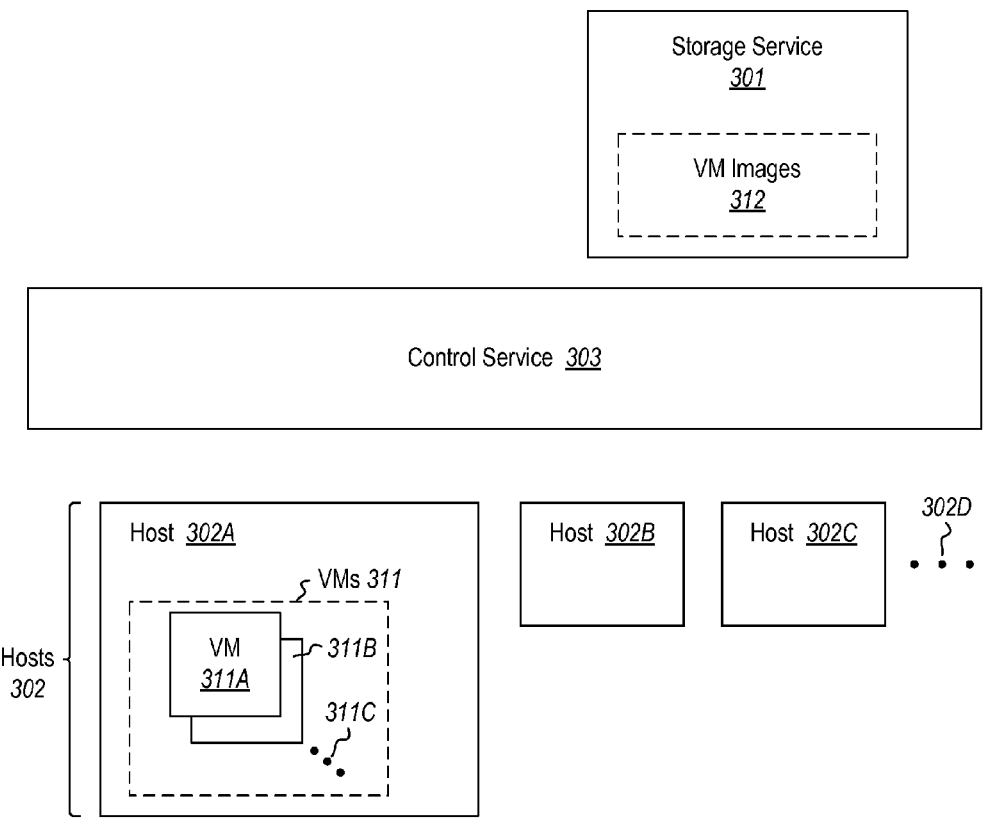
FIG. 3 illustrates an example computing environment that may be within the operating environment of FIG. 2.

FIG. 3 illustrates an example computing environment 300 that may be within the operating environment 200 of FIG. 2. The computing environment 300 may, for example, represent all or a portion of a cloud computing environment, although not required. The computing environment 300 is a specific example of the operating environment 200 of FIG. 2. The computing environment 300 includes a storage service 301. The storage service 301 stores the generalized virtual machines images 312, which represent an example of the generalized virtual machine images 212 of FIG. 2.

The computing environment 300 includes a plurality of host component systems 302. Although there are only three host computing system 302A, 302B, 302C illustrated in FIG. 3, there may be any number of host computing systems in the computing environment 300 as represented by the ellipses 302D. Each host computing system may be structured as described above, and represents a host environment that is capable of hosting a plurality of virtual machines. For instance, host computing system 302A, is illustrated as hosting virtual machines 311, including virtual machines 311A, 311B, amongst potential others as represented by the ellipses 311C. Virtual machines 311 represent an example of the virtual machines 211 of FIG. 2. The host computing systems 302 may each be structured as described above for the computing system 100 of FIG. 1, and typically represent a single physical machine with processing, memory, storage, and networking resources.

The computing environment 300 also includes a control service 303 that is configured to cause a host environment (such as host computing system 302A) to boot a virtual machine (such as virtual machine 311A) from a generalized virtual machine image (such as generalized virtual machine image 312A). The control service 303 makes the appropriate virtual machine image accessible to the host computing system 302A when provisioning a virtual machine from the virtual machine image. The combination of the host computing system 302A and the storage service 301 communicatively coupled via the control service 303 represents an example of the virtual machine service 200 of FIG. 2.

Figure 4:
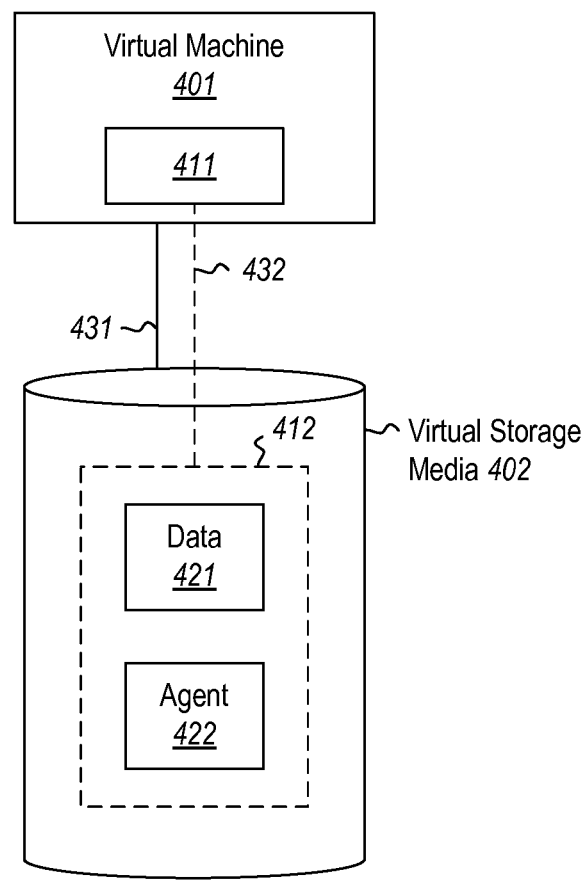
FIG. 4 illustrates an environment in which a virtual machine, such as those illustrated in FIGS. 2 and 3, may be instantiated, provisioned, and operated.

FIG. 4 illustrates an environment 400 in which a virtual machine 401 may be instantiated, provisioned, and operated. The environment 400 represents an example of the host computing system 302A of FIG. 3, and the virtual machine 401 is an example of the virtual machine 211A of FIG. 2, and the virtual machine 311A of FIG. 3. The environment 400 also includes virtual storage media 402 to which the virtual machine 401 may be connected so as to access data on the virtual storage media 402. The virtual storage media include boot computer-executable instructions 411 that are executed at boot time of the virtual machine 411. The virtual storage media 402 is emulated by a hypervisor using underlying physical resources abstracted away from the virtual machine 401.

The virtual storage media 402 includes content 412 that is made accessible to the virtual machine 401 in response to execution of the boot computer-executable instructions 411. The execution of the boot computer-executable instructions 411 also allows the virtual machine 401 to access content 412 of the virtual storage media 402 such as provisioning data 421 and a provisioning agent 422.

The provisioning data 421 includes data that may be used by the virtual machine to populate user-specific and machine-specific information within the virtual machine 401 so as to specialize the virtual machine 401 towards a particular user or machine. Thus, even though the virtual machine 401 is booted from a generalized virtual machine image, the virtual machine 401 ends up being specialized to a particular user and machine. Thus, the provisioning data 421 helps to provision the virtual machine 401. In one embodiment, the provisioning data may be an answer file, that is used by the virtual machine during the specialization phase of installation.

The provisioning agent 422 represents computer-executable code that may accessed (in response to executing the boot computer-executable instructions 411) and executed to perform tasks related to the provisioning of the virtual machine 401. For instance, the provisioning agent may monitor the progress of the provisioning process and/or report regarding the same.

Figure 5:
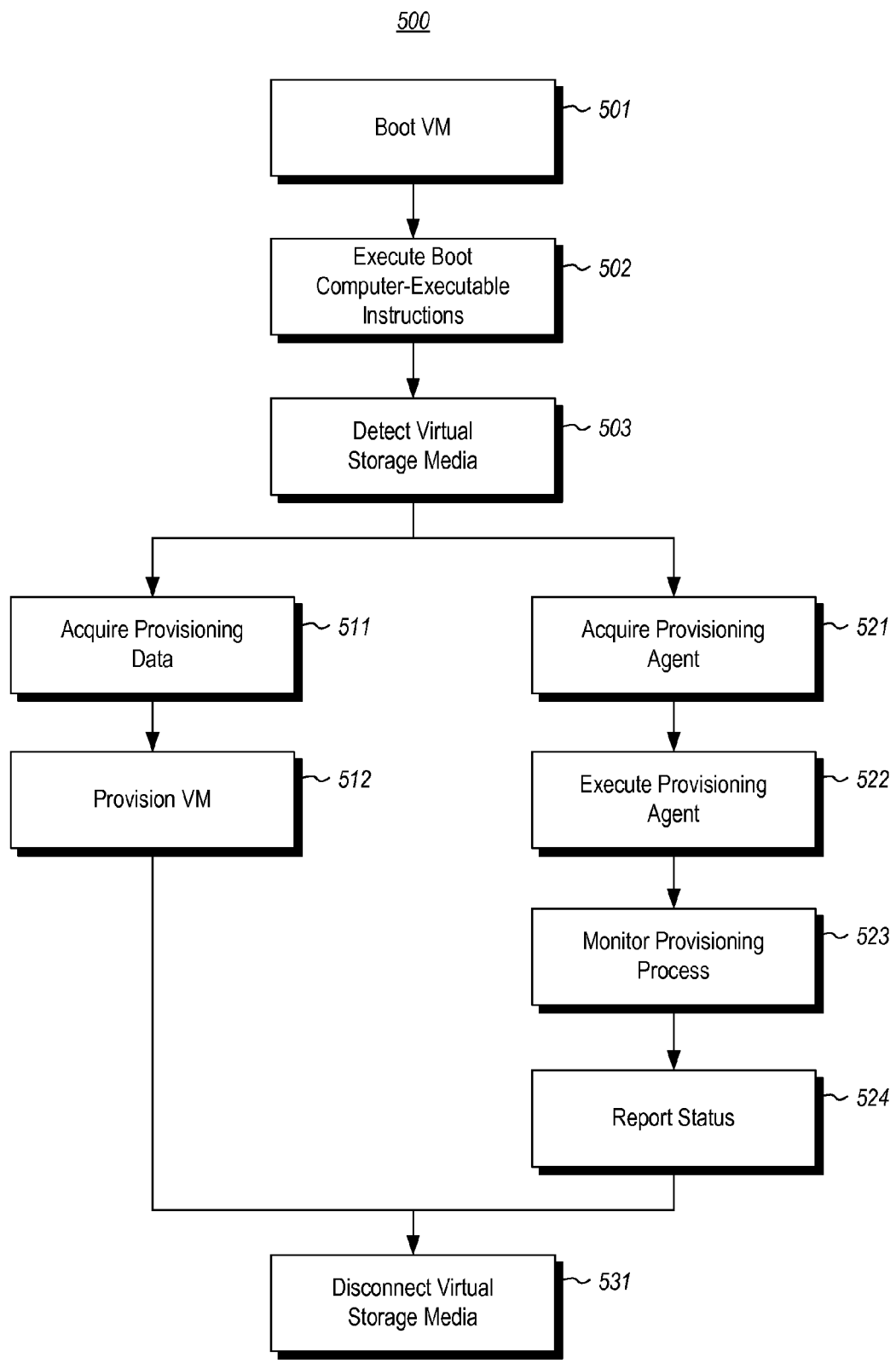
FIG. 5 illustrates a flowchart of a method for provisioning a virtual machine when booting the virtual machine from a generalized virtual machine image, in accordance with the principles described herein.

FIG. 5 illustrates a flowchart of a method 500 for provisioning a virtual machine when booting the virtual machine from a generalized virtual machine image. The method 500 is initiated upon initiating boot of the virtual machine (act 501). This involves creating virtual machine instance based on a generalized virtual machine image. Also, the virtual machine instance will be partially populated with parameters that are not specific to the user and/or client computing system that is to be assigned to the virtual machine.

In this state, the virtual machine contains boot executable-instructions. For instance, in FIG. 4, the virtual machine 401 includes boot computer-executable instructions 411. These boot computer-executable instructions are then executed (act 502).

The execution of the boot computer-executable instructions causes the virtual machine to detect virtual storage media that is accessible to the virtual machine (act 503). For instance, referring to FIG. 4, the virtual machine 401 executes the boot computer-executable instructions 411, causing the virtual machine 401 to detect and be able to access the virtual storage media 402, as represented by line 431. The virtual storage media is presented by a hypervisor which abstracts away underlying physical storage media. When a computing system boots up, one of the processes performed by some operating systems is to discover attached devices. It may be this process that discovers the virtual storage device. In some embodiments, this virtual storage media may be, for example, a virtual DVD drive.

Once the virtual machine detects the virtual storage device, the virtual machine has access to at least some of the content of the virtual storage device. For instance, in FIG. 4, the virtual machine 401 is capable of accessing the content 412 of the virtual storage media 402 through execution of the boot computer-executable instructions 411 as represented by the line 432. At this point, the virtual machine may acquire both the provisioning data (act 511) and the provisioning agent (act 521) from the virtual storage media. For instance, in FIG. 4, the virtual machine 401 acquires the provisioning data 421 and the provisioning agent 422 from the virtual storage media 402.

As an example, the provisioning data may be an answer file. Answer files are conventionally used to perform the specialization phase of operating system installation on a physical computing system. During installation of an operating system on a physical computing system, there are two phase; namely, a copying phase, and a specialization phase. During the copying phase, files are copied onto the physical computing system. During the specialization phase, the user is typically queried for user-specific or machine-specific information that will tailor the operating system for the physical computing system on which the operating system is being installed, and for the user of the physical computing system. However, it is conventionally known that instead of querying the user, the user and machine-specific information may instead be provided in an answer file that follows a particular schema. The installation process may instead review the answer file for answers to the relevant questions that would normally be posed to the user during installation. The provisioning data may include, for example, parameters such as, but not limited to, machine name, user accounts, user account settings, group policies, access password, time zone, and so forth.

The provisioning data is then used to provision the virtual machine (act 512). For instance, referring to FIG. 4, the execution of the boot computer-executable instructions 411 may cause the virtual machine 401 to query the provisioning data 421 (e.g., an answer file) for user specific or machine specific settings, and appropriately set its own settings with the same, thereby creating a virtual machine that is provisioned to the specific client machine and/or user that is assigned to use the virtual machine.

The virtual machine may also acquire the provisioning agent from the detected storage media (act 521). For instance, in FIG. 4, the virtual machine 401 acquires the provisioning agent 422 from the virtual storage media 402. This may be performed by the virtual machine 401 executing the boot computer-executable instructions 411.

The provisioning agent represents a collection of computer-executable instructions that may be executed by the virtual machine. The virtual machine then executes the provisioning agent (act 522). For instance, in FIG. 4, the virtual machine 401 may execute the provisioning agent 422 in response to executing the boot computer-executable instructions 411. The boot computer-executable instructions 411 and the provisioning agent 422 may each be collectively or individually embodied on a computer-readable media, such as a computer storage media, as a component of a computer program product.

For instance, suppose that the virtual machine being provisioned were the virtual machine 311A of FIG. 3. The provisioning agent may monitor the progress of the provisioning (act 523), and report the status of the provisioning of the virtual machine 311 (act 524) to the host computing system 302A, and then to the control service 303, and then to the user. Examples of reported status include the success or failure of the provisioning process, or perhaps a timeout status of the provisioning process (e.g., whether or not the provisioning has taken longer than a specified timeout period). Examples of control services 303 include services that support cloud computing systems such as, for example, MICROSOFT AZURE.

After the provisioning is completed, or at least after the provisioning data and the provisioning agent is acquired from the virtual storage device, the virtual storage device may be disconnected from the virtual machine (act 531), if the virtual storage device is not to be used for normal operation by the virtual machine.

In one embodiment, the operating system (hereinafter referred to as a "boot enabled operating system") of the virtual machine may be of a type that has boot-time computer-executable instructions 411 that are executed automatically during boot time to cause the virtual machine to acquire and use the provisioning data to provision the virtual machine, and to acquire and execute the provisioning agent. An example of such a computing system is MICROSOFT WINDOWS.

In one embodiment, the operating system (hereinafter referred to as a "non-boot enabled operating system") of the virtual machine may be of a type that does not have such boot-time computer-executable instructions 411. An example of such an operating system is LINUX. In this case, when the generalized virtual machine image is generated that includes such an operating system, the boot-time computer-executable instructions 411 are added to the generalized virtual machine image, so that they are present within and executed by the virtual machine at boot time.

The method 500 may be repeated for different virtual machines provisioned from the same generalized virtual machine image, whether for the same user and/or client machine, or whether for different users and/or virtual machines.

Furthermore, the method 500 may be repeated for different virtual machines provisioned off of different virtual machine images. Such different virtual machine images may have the same operating system, or different operating systems. Furthermore, the different virtual machine images may all have operating systems that are of a boot-enabled operating system type, may all have operating systems that are of a non-boot-enabled operating system type, or may be a mix of the two. However, as previously mentioned, for those generalized virtual machine images that have non-boot-enabled operating systems, the virtual machine image will be altered to include the boot-time computer-executable instructions 411.

The principles described herein allow for the provisioning of a virtual machine in a networked environment, such as a cloud computing environment, so as to be able to report status regarding the provisioning to the user. Furthermore, as described with respect to FIG. 6 below, the provisioning may be accomplished without the user needing to construct the provisioning data in a format that is readable by the virtual machine. For instance, the user need not have the sophistication to be able to generate an answer file, or take the time to generate the answer file.

Figure 6:
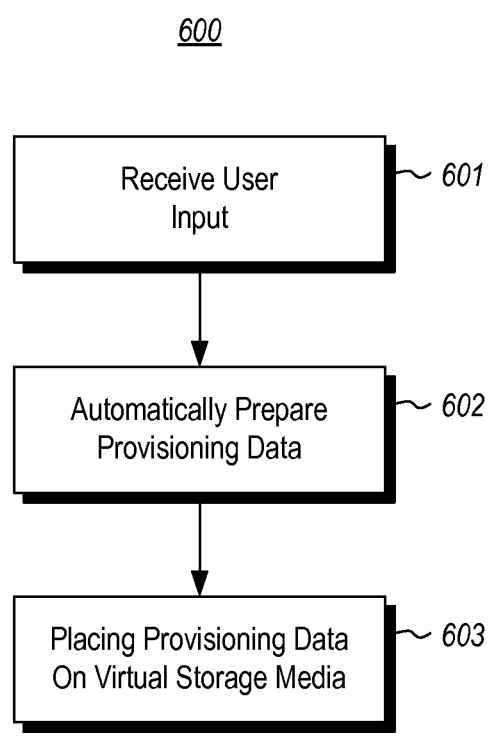
FIG. 6 illustrates a flowchart of a method for preparing the provisioning data in a manner that the user need not generate the provisioning data in the proper format readable by the virtual machine.

FIG. 6 illustrates a flowchart of a method 600 for preparing the provisioning data in a manner that the user need not generate the provisioning data in the proper forward readable by the virtual machine. The method 600 may be performed by, for example, a service within the operating environment 200. The method 600 may be performed by a computing system (perhaps distributed) such as the computing system 100 described above with respect to FIG. 1.

According to the method 600, user input regarding user and/or client specific settings is received (act 601). Examples of user specified information: VM machine name; administration password; whether to force the user to change the password on first logon; whether to enable automatic updates; and the time zone. The settings may also be for allowing the VM to join a domain such as 1) the domain in which the VM is to operate, 2) the username of the user of the VM within the domain, and 3) the user password of the user of the VM within the domain; settings that configure a new role with a set of specified hosted service certificates. The types of user or client-specific information acquired from the user may vary depending on the operating system that is present on the virtual machine image.

The method 600 then includes automatically preparing provisioning data in a format recognizable by the virtual machine (act 602). The provisioning data is then placed on the virtual storage media (act 603) so that it is accessible by the virtual machine once the virtual storage media is discovered by the virtual machine during boot of the virtual machine from the generalized virtual machine image.

Accordingly, the principles described herein provide a mechanism for provisioning a virtual machine in a networked environment, such as a cloud computing environment, in a manner in which the user need not create provisioning data in a format readable by the virtual machine, such that the virtual machine may be booted from a generalized virtual machine image, and such that status information regarding the provisioning may be reported to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
one or more processors; and
one or more storage devices having stored thereon computer-executable instructions that are executable by the one or more processors and that configure the computer system to provision a virtual machine when booting an operating system from a generalized virtual machine image, including computer-executable instructions that configure the computer system to perform at least the following:
create a virtual machine instance based on a generalized virtual machine image, the generalized virtual machine image comprising an operating system having boot-executable instructions that are configured to be executed during a boot time of the operating system to provision the virtual machine instance; and
at the boot time of the operating system, execute the boot-executable instructions to provision the virtual machine instance, the boot-executable instructions being configured to:
access a virtual storage media that is attached to the virtual machine instance, the virtual storage media including (i) provisioning data comprising one or more settings for the virtual machine instance, and (ii) a provisioning agent that is executable by the virtual machine instance for at least one or more of monitoring progress of provisioning of the virtual machine instance or reporting status of the provisioning of the virtual machine instance;
acquire the provisioning data and the provisioning agent from the virtual storage media; and
provision the one or more settings of the virtual machine instance according to the provisioning data, while executing the provisioning agent for at least one or more of monitoring progress of the provisioning or reporting status of the provisioning.

2. The computer system of claim 1, wherein the virtual storage media is not used by the virtual machine instance during normal operation after the provisioning.

3. The computer system of claim 1, also including computer-executable instructions that configure the computer system to disconnect the virtual storage media from the virtual machine instance after the provisioning.

4. The computer system of claim 1, wherein the virtual storage media is a virtual DVD drive.

5. The computer system of claim 1, wherein the virtual machine instance operates in a cloud computing environment.

6. The computer system of claim 1, wherein executing the provisioning agent causes the virtual machine instance to cause a status of the provisioning to be reported to a user through a cloud computing environment.

7. The computer system of claim 6, wherein the reported status of the provisioning includes a success or failure of the provisioning.

8. The computer system of claim 6, wherein the reported status of the provisioning includes a timeout status of the provisioning.

9. The computer system of claim 1, wherein the provisioning data is automatically generated by a cloud computing service in a format readable by the virtual machine instance using information received from a user.

10. A method, implemented at a computer system that includes one or more processors, for provisioning a virtual machine when booted from a generalized virtual machine image, the method comprising:

creating a virtual machine instance based on a generalized virtual machine image, the generalized virtual machine image comprising an operating system having boot-executable instructions that are configured to be executed during a boot time of the operating system to provision the virtual machine instance; and during boot of the operating system, executing the boot-executable instructions, which are configured to:

detect that a virtual storage media is accessible to the operating system, the virtual storage media including (i) provisioning data comprising one or more settings for the virtual machine instance, and (ii) a provisioning agent that is executable by the virtual machine instance for at least one or more of monitoring progress of provisioning of the virtual machine instance or reporting status of the provisioning of the virtual machine instance;

acquire the provisioning data and the provisioning agent from the detected virtual storage media;

provision the one or more settings of the virtual machine instance according to the provisioning data; and while provisioning the one or more settings of the virtual machine instance, execute the provisioning agent, which performs one or more of monitoring progress of the provisioning or reporting status of the provisioning.

11. The method of claim 10, further comprising:
disconnecting the virtual storage media from the virtual machine after the provisioning.

12. The method of claim 10, wherein execution of the provisioning agent causes the virtual machine instance to report status of the provisioning to a user through a cloud computing environment.

13. The method of claim 12, wherein the reported status of the provisioning includes a success or failure of the provisioning.

14. The method of claim 12, wherein the reported status of the provisioning includes a timeout status of the provisioning.

15. The method of claim 10, wherein the virtual machine instance operates in a cloud computing environment.

16. The method of claim 10, wherein the provisioning data is automatically generated by a cloud computing service in a format readable by the virtual machine instance using information received from a user.

17. The method of claim 10, wherein the virtual storage media is a virtual DVD drive.

18. A computer program product comprising one or more hardware storage devices having stored thereon computer-executable instructions that are executable by one or more processors of a computing system and that configure the computing system to provision a virtual machine when booting an operating system from a generalized virtual machine image, including computer-executable instructions that configure the computing system to perform at least the following:

create a virtual machine instance based on a generalized virtual machine image, the generalized virtual machine image comprising an operating system having boot-executable instructions that are configured to be executed during a boot time of the operating system to provision the virtual machine instance; and at the boot time of the operating system, execute the boot-executable instructions to provision the virtual machine instance, the boot-executable instructions being configured to:

access a virtual storage media that is attached to the virtual machine instance, the virtual storage media including (i) provisioning data comprising one or more settings for the virtual machine instance, and (ii) a provisioning agent that is executable by the virtual machine instance for at least one or more of monitoring progress of provisioning of the virtual machine instance or reporting status of the provisioning of the virtual machine instance;

acquire the provisioning data and the provisioning agent from the virtual storage media; and provision the one or more settings of the virtual machine instance according to the provisioning data, while executing the provisioning agent for at least one or more of monitoring progress of the provisioning or reporting status of the provisioning.

19. The computer program product of claim 18, also including computer-executable instructions that configure the computing system to disconnect the virtual storage media from the virtual machine instance after the provisioning.

20. The computer program product of claim 18, wherein executing the provisioning agent causes the virtual machine instance to cause a status of the provisioning to be reported to a user through a cloud computing environment.

* * * * *